United States Patent
Gavinsky et al.

(10) Patent No.: US 8,485,427 B2
(45) Date of Patent: Jul. 16, 2013

(54) SYSTEM AND METHOD FOR SYNTHETIC COMMODITY AND SYNTHETIC LEGAL TENDER CREATION

(75) Inventors: Dmitry Gavinsky, Pennington, NJ (US); Martin Roetteler, East Windsor, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 314 days.

(21) Appl. No.: 12/904,234

(22) Filed: Oct. 14, 2010

(65) Prior Publication Data

US 2012/0091193 A1 Apr. 19, 2012

(51) Int. Cl.
*G06F 17/00* (2006.01)
(52) U.S. Cl.
USPC ............................. 235/375; 235/379
(58) Field of Classification Search
USPC ................. 235/375, 379; 705/17, 44
See application file for complete search history.

(56) References Cited

U.S. PATENT DOCUMENTS

| | | | |
|---|---|---|---|
| 5,917,322 A | 6/1999 | Gershenfeld et al. | |
| 7,189,986 B2 | 3/2007 | Saito | |
| 7,246,240 B2 | 7/2007 | Chuang et al. | |
| 7,346,246 B2 | 3/2008 | Munro et al. | |
| 7,509,292 B2 * | 3/2009 | Walmsley | 705/64 |
| 2005/0062072 A1 | 3/2005 | Yamamoto et al. | |
| 2006/0129486 A1 | 6/2006 | Ohkuma et al. | |
| 2010/0280949 A1* | 11/2010 | Van Rensburg | 705/44 |

OTHER PUBLICATIONS

Aaronson, S. "Quantum Copy-Protection and Quantum Money" 2009 24th Annual IEEE Conference on Computational Complexity. Jul. 2009. pp. 229-242.
Chaum, D., et al. "Untraceable Electronic Cash" Advances in Cryptology—CRYPTO '88, 8th Annual International Cryptology Conference. Aug. 1988. (9 Pages).
Wiesner, S. "Conjugate Coding" Sigact News. vol. 15, No. 1. Dec. 1983. pp. 78-88.

* cited by examiner

*Primary Examiner* — Ahshik Kim
(74) *Attorney, Agent, or Firm* — Joesph Kolodka

(57) ABSTRACT

A quantum mechanical credit unit includes a plurality of qubit strings stored in computer readable storage media and configured for comparison with challenge questions during a verification procedure. The plurality of qubit strings is stored in at least k registers where k is a selected security number for the credit unit. An information register stores information about qubit strings that remain unused to provide the used qubit strings during the verification procedure. A unique serial number is configured to identify the credit unit without association with its holder or the qubit strings. Issuance and verification methods for the credit unit are also disclosed.

19 Claims, 7 Drawing Sheets

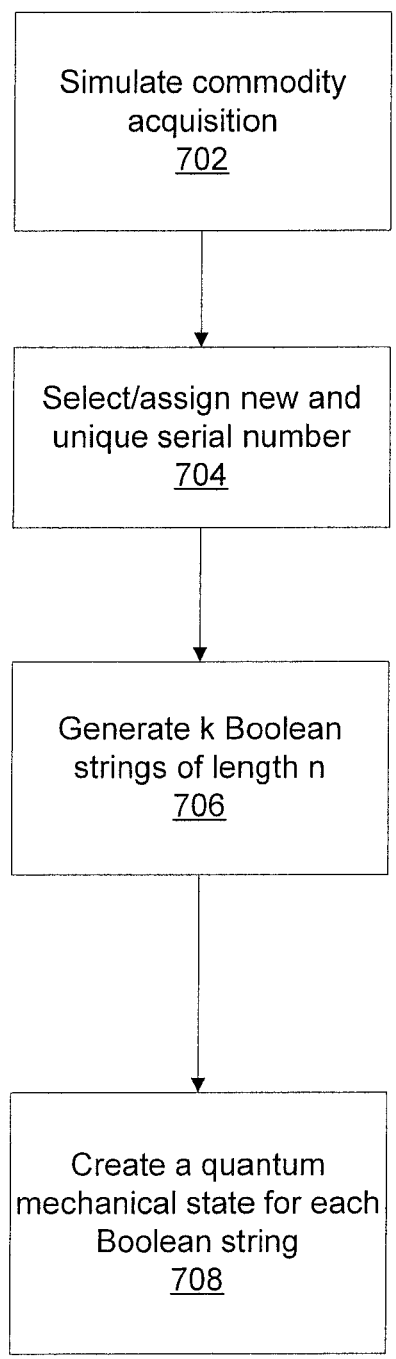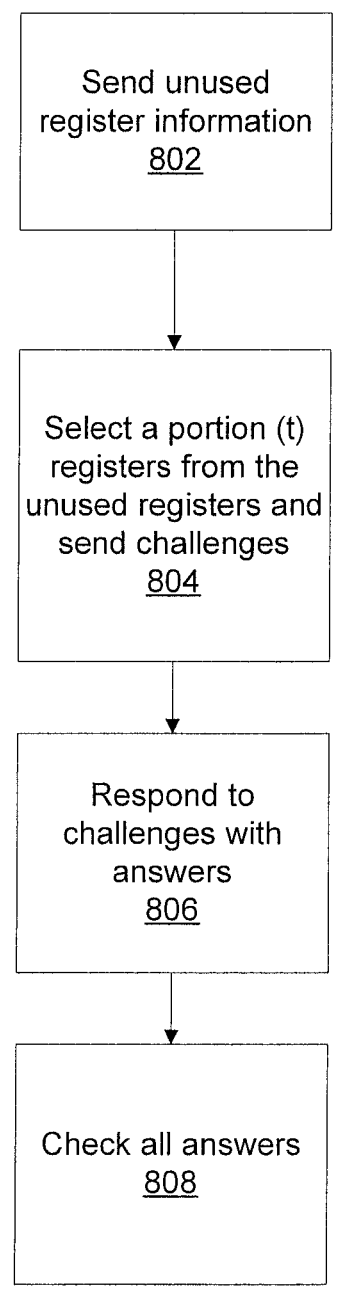
FIG. 7
FIG. 8

SYSTEM AND METHOD FOR SYNTHETIC COMMODITY AND SYNTHETIC LEGAL TENDER CREATION

BACKGROUND

1. Technical Field

The present invention relates to quantum mechanical systems and more particularly to systems and methods that employ principles of quantum mechanics for commodity and legal tender production.

2. Description of the Related Art

Commodities are items for which there is a basic demand and which can be provided through generation processes. Examples are precious metals, such as gold, silver, etc., energy commodities such as oil, gas, and food commodities. In times of massive global devaluation of currencies, commodities offer some potential for preservation of wealth. A reason for this is the difficulty in generating the commodities. This could be, for example, due to mining or due to growing, which also is reflected in the price in terms of fiat currencies that have to be paid according to the market value of the commodity.

A basic problem with commodities that have money-like features, e.g., precious metals, is that they can become subject to speculation ("cornering the market", sell/buy transactions without underlying physical assets, manipulation in futures markets, etc.). They can also become extremely scarce as some governments or private entities buy them on a large scale. One question is whether it is possible to provide substitute commodities in lieu of physical commodities that are based on information only but nevertheless share all the features of real (hard, physical) commodities. Another problem, which is closely related, is whether it is possible to base legal tender, i.e., methods for payment in a monetary system based on fiat currency, e.g., dollar bills, on information only without additional assumptions.

Properties of legal tender and commodities that serve as monetary equivalents should be hard to counterfeit. These items should be easy to verify, and they should be anonymous, leaving no history of previous transactions. For commodities, it is imposed, in addition, that it should be difficult, though not impossible, to generate them, even for a powerful entity such as a government.

Digital cash, as described in D. Chaum, A. Fiat, and M. Naor, "Untraceable electronic cash," Advances in Cryptology (Crypto'88), Springer Verlag, pp. 319-327, 1990, provides a way for anonymous, untraceable, and transferable implementation of legal tender that is completely electronic. Digital cash security is typically based on computational assumptions, such as the computational hardness of certain problems, and the existence of a trusted third party, such as a central bank or the issuing bank. Most protocols that have been proposed for digital cash suffer from these restrictions as well as the restrictions on off-line payments. Key sizes that are required to implement the schemes are usually quite large, e.g., in the hundreds of megabytes for a single coin.

S. Wiesner, in "Conjugate Coding," SIGACT News, Vol. 15, No. 1, pp. 78-88, 1983 (hereinafter Wiesner), proposed a quantum cash scheme that uses the fact that quantum state is not cloneable in order to make a "coin" that cannot be duplicated, as it contains a quantum state that is known only to the trusted bank but not to the currency holders. Moreover, the bank is able to use its knowledge in order to verify, given a coin, whether it is authentic or not. The security of Wiesner's construction was unconditional: the coins could not be copied because of the fundamental laws of physics, even if somebody tries to use the most advanced tools in order to produce a counterfeit.

Wiesner's scheme, however, had the disadvantage that only the bank would be able to test the validity of a coin. In order to be verified, a coin had to be sent to the bank, which, of course, made the construction very unpractical. S. Aaronson, in "Quantum copy-protection and quantum money," IEEE Conference on Computational Complexity, pp. 229-242, 2009 (hereinafter Aaronson), proposed a quantum cash scheme that addressed this drawback of Wiesner by letting each user check the validity of quantum coins. This made the scheme more convenient to use, however, it compromised the unconditional security: the users could not only check, but also forge a coin, if they have enough computational power.

Unfortunately, it can be seen that any scheme that allows any user to check the validity of quantum coins unavoidably also allows them to produce counterfeits, if they have enough computational power.

SUMMARY

A quantum mechanical credit unit includes a plurality of qubit strings stored in computer readable storage media and configured for comparison with challenge questions during a verification procedure. The plurality of qubit strings is stored in k registers, where k is a selected security number for the credit unit. An information register stores information about qubit strings that remain unused to provide the used qubit strings during the verification procedure. A unique serial number is configured to identify the credit unit without association with its holder or the qubit strings. Issuance and verification methods for the credit unit are also disclosed.

A method for issuing a credit unit includes associating a credit unit with a new and unique serial number; generating a sequence of k random Boolean strings of length n, where k and n are security parameters; generating quantum mechanical states of the form $\Sigma_{1 \leq i \leq n}(-1)^{x_i}|i\rangle$, where i runs over coordinates of the Boolean strings, x, to generate the quantum states later employed in verification of the credit unit; and storing the credit unit together with its serial number in a computer readable storage media which enables transference of the credit unit in accordance with a transaction.

A method for validating a credit unit includes providing by a holder of the credit unit under verification to a validating entity a list of all credit unit registers that have not been used in previous verifications, wherein the credit unit registers include qubit strings with quantum mechanical states of the form $\Sigma_{1 \leq i \leq n}(-1)^{x_i}|i\rangle$, where i runs over coordinates of Boolean strings, x, to generate the quantum states; selecting by the validating entity a portion of the registers from the list of unused registers and sending back the list of selected registers along with challenges, one for every selected register; responding by the holder of the unit under verification to the challenges with respect to the selected registers; and declaring the verification a success if and only if a needed amount of answers are valid.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 7 is a block/flow diagram showing issuance of quantum-mechanical synthetic commodities in FIG. 2 in further detail; and FIG. 8 is a block/flow diagram showing verification of quantum-mechanical synthetic commodities in FIG. 2 in further detail.

DETAILED DESCRIPTION OF PREFERRED EMBODIMENTS

Figure 1:
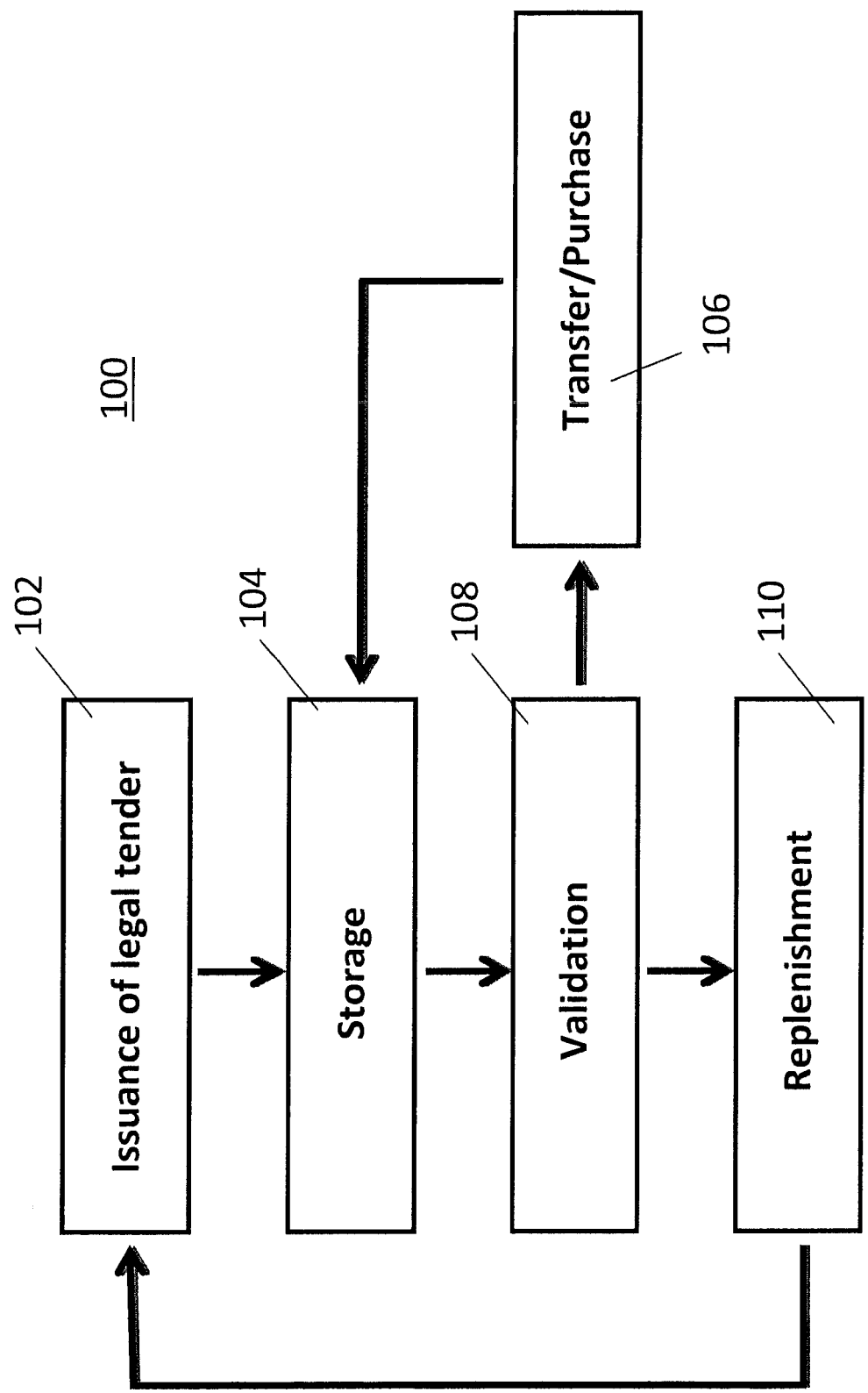
FIG. 1 is a block/flow diagram showing a system/method for circulation of quantum-mechanical legal tender in accordance with one embodiment.

In accordance with the present principles, systems and methods are provided for the use, generation and validation of legal tender and commodities based upon quantum mechanics. It can be seen that any quantum cash scheme that allows local checking of a coin's validity by users loses unconditional security. Such schemes are considered reliable but only as long as potential intruders are assumed to be computationally limited. The present embodiments address issues related to these validity problems for coins, for example, when convenience of use comes at the price of loosing unconditional security guarantees. The present embodiments provide a quantum cash scheme that can, at the same time, admit unconditional security guarantees and provide simplicity of verification using classical communication channels. Moreover, the classical channels used do not have to be encrypted. The whole verification protocol can be run openly through a public communication channel of any type, and not compromise the security of the system or transaction.

The present principles can be used to replace an existing system for monetary exchange with a new system that is entirely based on information-theoretic principles. It could be used as an alternative to traditional legal tender, offering the benefit of being provably unforgeable. The methods are based on the principles of quantum-mechanics and no other computational assumptions or trusted third parties. The present principles can also be used to replace existing commodity based systems, mimicking their property of providing a more stable and intrinsic value as opposed to fiat currencies.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Embodiments for storage of quantum-mechanical information (quantum bits or short: qubits) may employ one or a plurality of available schemes. For example, quantum optical systems in which quantum mechanical degrees of freedom can be used to store quantum information, e.g., the polarization of photons or the phase delay between two optical pulses (see e.g., U.S. Pat. No. 7,346,246, incorporated herein by reference). Another physical embodiment for storing quantum information is the spin of electrons or nuclei, such as protons. Experimental progress in this direction has been made towards several physical implementations, including quantum dots (see e.g., U.S. Pat. No. 7,189,986, incorporated herein by reference), superconducting quantum circuits (see e.g., U.S. Patent Application No. 2005/0062072, incorporated herein by reference), trapped ions, and nuclear magnetic resonance techniques (see e.g., U.S. Pat. No. 5,917,322, incorporated herein by reference). The quantum mechanical medium used to implement storage and readout of the quantum information may include one or a plurality of such physical systems, where the method of storage of information and the method of readout of information will depend on the particular system chosen.

Referring now to the drawings in which like numerals represent the same or similar elements and initially to FIG. 1, a system 100 implements a legal tender such as, e.g., the US dollar. The system 100 realizes a legal tender that, on the one hand, preserves unconditional security of construction, and permits every user to verify the coins more conveniently. Namely, to verify validity of a coin or credit unit, a user should only exchange classical data with the bank. This is, of course, much less challenging technically and more reliable than sending a quantum coin to the bank and then back to the user. Advantageously, the present construction is unconditionally secure, without assuming that a potential attacker is computationally limited.

In block 102, legal tender is issued by a government or institution. In block 104, the legal tender is stored (e.g., in an account). In block 106, the currency is validated. The validation may be performed by the user, the bank or any other person or institution. In block 108, valid legal tender may be transferred or employed to carry out a transaction such as a purchase. The amount in the account is updated in storage (block 104). Replenishment or the addition of new legal tender may be needed in block 110 and the issuance of legal tender in block 102 is called for.

FIG. 1 highlights the components of a system that implements a legal tender such as the US dollar. In accordance with the present principles, these features will include a new type of scheme for realizing a legal tender that, on the one hand, preserves the unconditional security of Wiesner's construction, and on the other hand allows every user to verify the coins more conveniently. To verify validity of a coin, the user should only exchange classical data with the bank. This is, of course, much less challenging technically and more reliable than sending the quantum coin to the bank and then back to the user, as Wiesner's construction would require. Comparing our scheme to Aaronson's, our construction is unconditionally secure, without assuming that a potential attacker is computationally limited.

Figure 2:
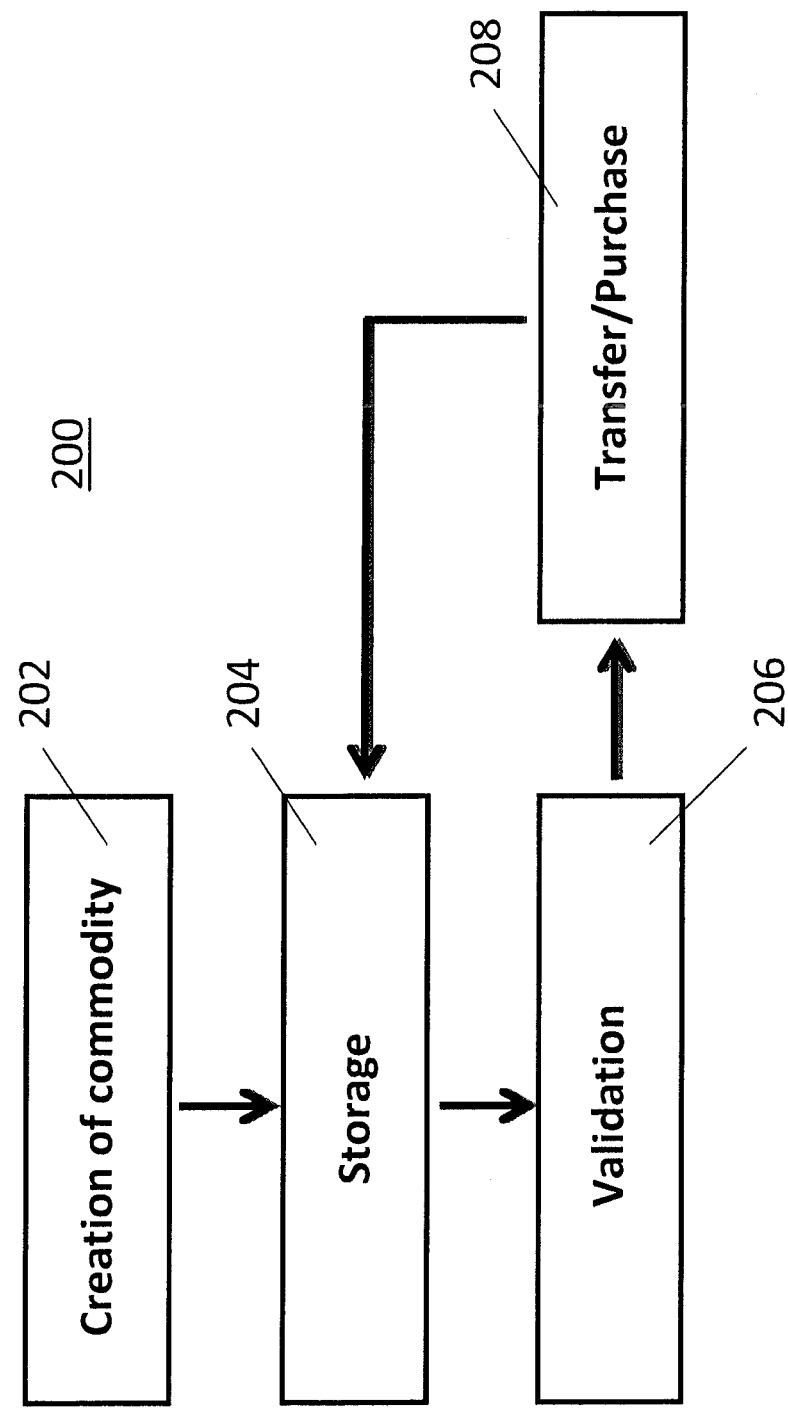
FIG. 2 is a block/flow diagram showing a system/method for circulation of quantum-mechanical synthetic commodities in accordance with another embodiment.

Referring to FIG. 2, a system 200 for transactions with respect to a commodity, such as gold, is illustratively presented. A new type of scheme for realizing a commodity offers unconditional security and permits every user to verify the coins. In addition, a salient feature of the system 200 for realizing synthetic commodities includes an underlying difficulty in creating new instances of the commodity, which models the situation of real, physical commodities that have to be mined, grown, or harvested. In contrast to these commodities, the present system 200 is based on the validity of quantum mechanics.

In block 202, a commodity is created. In block 204, the commodity is stored. In block 206, the commodity is validated. The validation may be performed by the user, a trader, or any other person or institution. In block 208, valid commodities may be transferred or employed to carry out a transaction such as a purchase or trade.

The systems 100 and 200 will be described hereinafter in greater detail. These systems 100, 200 can be used to replace an existing system for monetary exchange with a new system that is entirely based on information-theoretic principles. The systems could be used as an alternative to traditional legal tender, offering the benefit of being provably unforgeable. The system/methods are based on the principles of quantum-mechanics and no other computational assumptions or trusted third parties need be provided. The present embodiments may also be used to replace existing commodity based systems, mimicking their property of providing a more stable and intrinsic value as opposed to fiat currencies.

FIG. 2 highlights main components of a system for transactions with respect to a commodity, such as gold. A new type of scheme for realizing a commodity that, like the scheme for legal tender described above, offers unconditional security and allows every user to verify the coins. In addition, a feature of the system for realizing synthetic commodities is that there is an underlying difficulty in creating new instances of the commodity which models the situation of real, physical commodities that have to be mined, or grown, or harvested. In contrast to these commodities, our system is purely information theoretical and based only on the validity of quantum mechanics.

Referring again to FIG. 1, the system 100 for synthetic legal tender based on quantum-mechanical principles will be described in further detail. In block 102, a procedure for issuing new tender is provided. In block 102, an entity which is authorized to issue new tender creates a new instance. Part of this generation is the preparation of suitable quantum states, as well as the generation of a unique serial number. In block 104, storage of the legal tender is provided. This employs the ability to store a particular coin for a long period in time. Since the part of the underlying information is quantum-mechanical, this leads to a set of very special and stringent requirements on the system 100. Systems for reliable long-term storage of quantum information, including quantum states that are entangled across a very small number of qubits (in one embodiment, e.g., as small as 2). Possible physical implementations of the storage 104 may include photons, semiconductors, and possibly even certain liquids such as para-hydrogen which is known to have a very long coherence time.

In block 108, validation of the legal tender is carried out. This may involve the holder of the coin and the bank that issued the coin. Validation happens right before or during the process of a purchase, when the vendor wants to make sure that the coin is valid. Validation can also be applied during any other point during the lifetime of the coin, e.g., when the owner wants to make sure that the coin in his or her possession is real. The validation in block 108 may include a classical message interchange with the bank. This may have the character of a challenge-response test.

In block 106, transfer of the legal tender is performed. This happens for the purpose of exchanging tender for goods and includes the physical hand-off of the coin, including its quantum-mechanical parts to a new owner. After this, the new owner will put the coin into storage (104) and will close the loop for another validation/purchase cycle. In block 110, replenishment of the legal tender is provided. A feature of the coins is that they can be used for a finite number of validation challenges only. After the limit has been reached, the life-time of the coin is over and a new coin has to be issued. This includes an interaction with the bank or other institution which issues a new coin on behalf of the previous owner.

Figure 3:
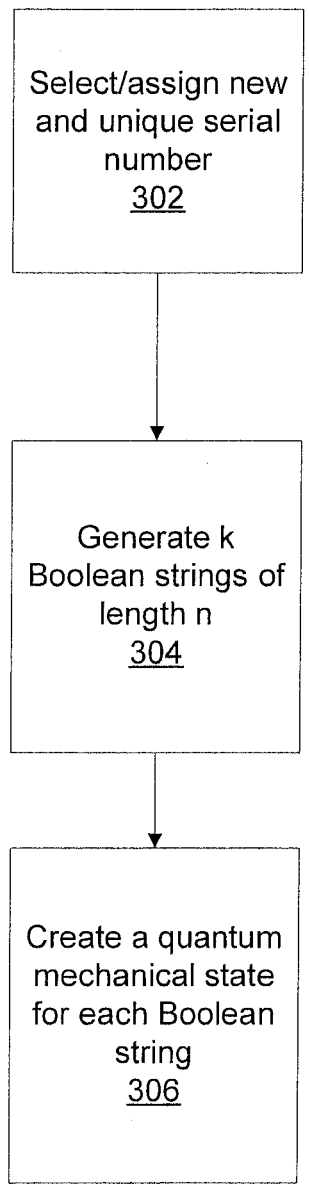
FIG. 3 is a block/flow diagram showing issuance of quantum-mechanical legal tender in FIG. 1 in further detail.

Referring to FIG. 3, block 102 which handles the issuance of new coins is described in further detail. In block 302, a new and unique serial number is selected or assigned which will be attached to the coin. Also, in block 304, a sequence of k random Boolean strings of length n is generated for each quantum register state, where k and n are a security parameter that can be chosen beforehand. The Boolean strings may be randomly generated or have portions selected by the bank or other institution, n may be any number, but is preferably greater than 2. In block 306, for each of the Boolean strings x that were generated, a quantum mechanical state (up to normalization) of the form $\Sigma_{1 \leq i \leq n}(-1)^{x_i}|i\rangle$, is created, where i runs over the coordinates of x. Notice that only log(n) qubits are necessary for creating one state of this form. In a simple embodiment, n is chosen to be the number 2, i.e., in this case pairs of qubits are used to represent the state. The qubit strings may include random data. A description of the components of the coin for this case will be described hereinafter with reference to FIG. 4A.

Figure 4A:
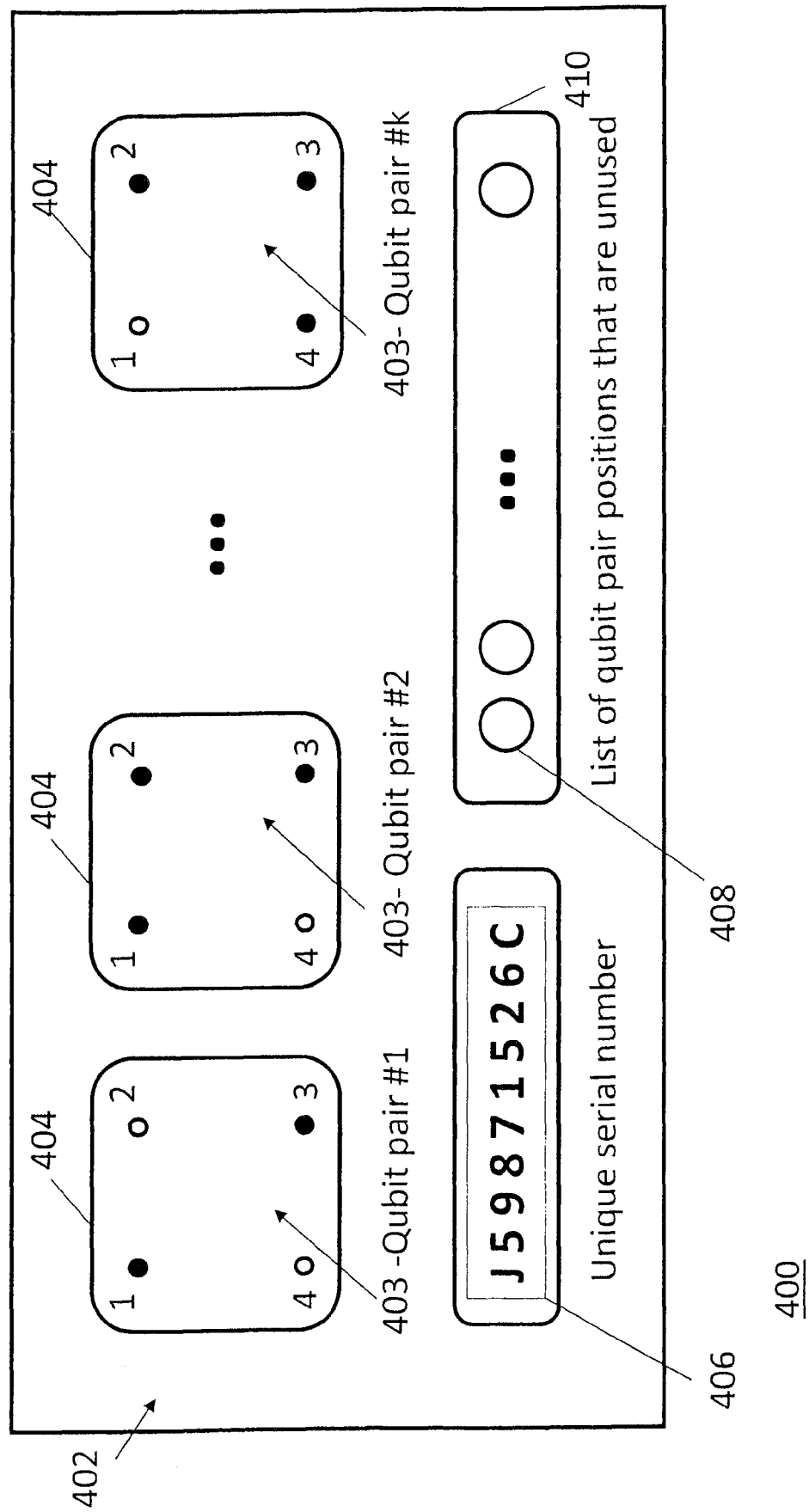
FIG. 4A is a block diagram showing a credit unit or coin for the quantum-mechanical legal tender or commodity in accordance with one illustrative embodiment.

Referring to FIG. 4A, a coin 400 includes quantum registers 404 which store a coloring of four basis states of each qubit pair 403 (e.g., n=2) with two colors, which are stored in the quantum registers 404. The two colors are shown as open and bold circles. The states stored in registers 404 may be generated using a quantum mechanical process. (The qubit strings may include random data generated using a quantum mechanical state generator.) A serial number 406 is used to associate Boolean operations with registers 404 of the coin 400 but cannot be used to track the coin 400 or its owner. The serial number 406 is unique, i.e., for each unit of legal tender there is one and only one integer number that uniquely identifies the unit. The number of digits chosen to represent the number depends on the total number of units that are anticipated to be in circulation. A possible choice might be to use a combination of 10 digits that are combinations of numbers in the range 0-9 and letters in the range A-Z, in which case the total number of units in circulation could be as high as $(10+26)=36^{10}$.

Information 408 about quantum-mechanically active parts of the coin 400 is stored in a register 410. The quantum-mechanically active parts of the coin 400 may change during the life-span of the coin. Information 408 stored in the register 410 includes identification of which registers 404 remain unused.

Figure 4B:
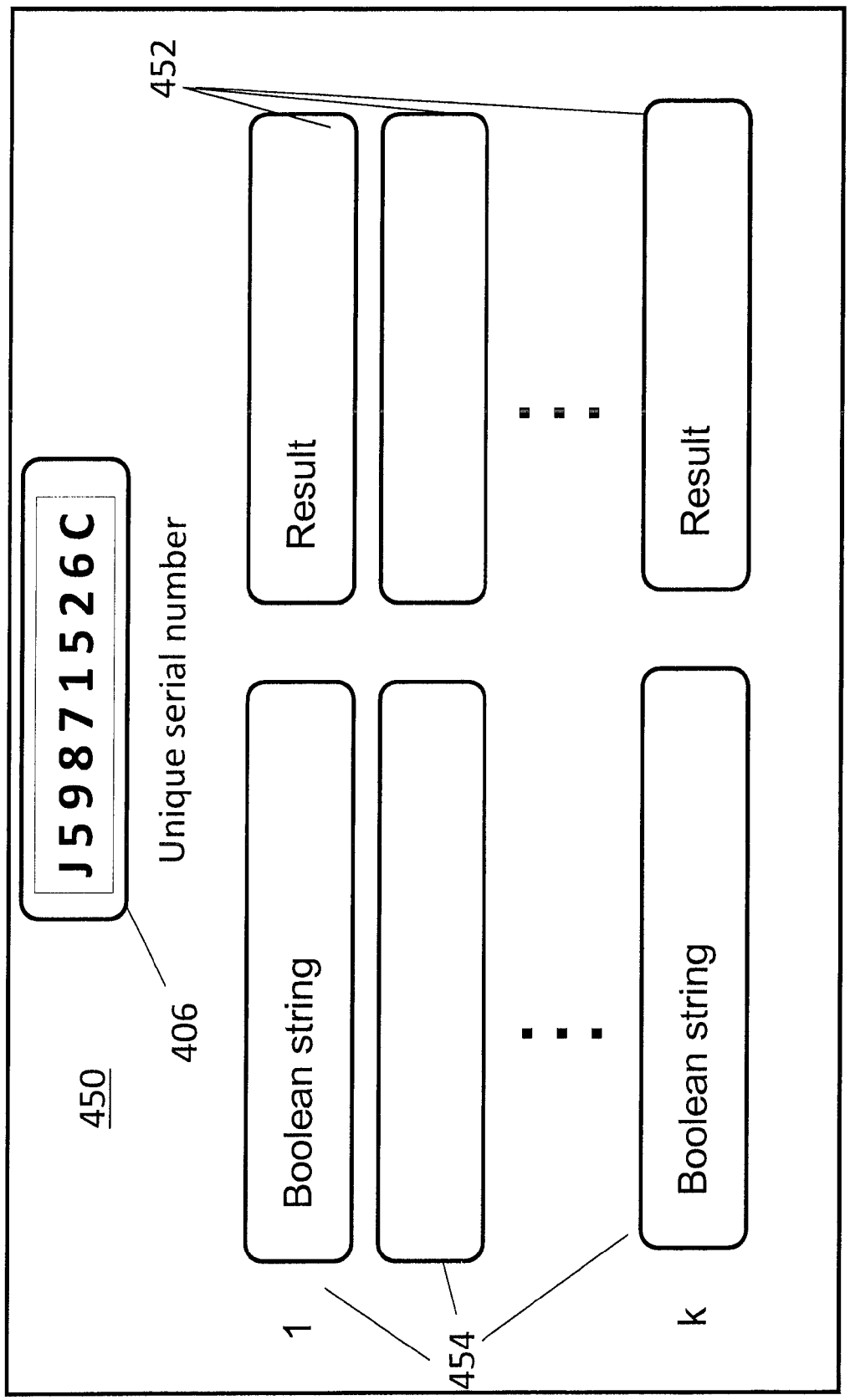
FIG. 4B is a block diagram showing a an issuing record or file for an issuing or validating entity in accordance with one illustrative embodiment.

Referring to FIG. 4B with continued reference to FIG. 4A, a validation record or file 450 is stored by an issuing entity. The issuing entity generates a Boolean string, x, for each register 404 (or for combinations of registers, etc. depending on the validation method selected). Strings, x, preferably include Boolean operations to be performed on the qubits of a credit unit. The entity stores the generated Boolean strings, x, in memory 454 of the file 450. The Boolean operations (AND, OR, NOR, NAND, etc.) are associated with each register 404, groups of registers 404 or combinations of registers 404 on the credit unit 400 and are applied to the quantum states 403 to obtain a result. The results of the Boolean operations are stored in registers 452 associated with that serial number 406 without storing the underlying quantum information stored in registers 404.

All the validation procedures are entirely passive, i.e., the bank (issuing entity) does not learn information about the coin (quantum states) nor its current holder. When a validation request is received, the issuing entity sends challenges that employ the Boolean operations stored in file 450 which were applied to the registers 404 during issuance. A new answer is generated for each challenge by the credit unit holder. The answers generated by the holder should match the stored results (in registers 452); otherwise, tampering with the quantum states has occurred.

It should be noted that the present example formulates a Boolean string for each register; however, a Boolean string may be generated for a plurality or combination of registers. The issuing entity may also employ a subset of registers 404 or combinations of different registers 404 to generate the Boolean result, where the same computation is performed for the challenge as performed during the credit unit creation to duplicate the results since the issuing entity does not know the quantum states stored on the credit unit 400.

Referring again to FIG. 3 with continued reference to FIG. 4A, in block 306, the coin 400 includes a set of k quantum states 403 as generated in block 304, together with the unique serial number 406. Also, part of the coin 400 includes register 410 holding classical information about which of the quantum bits was acted upon by a subsequent measurement (e.g., validation). The measurement to be implemented may be a POVM (positive operator valued measure) that operates on a small and fixed number of quantum bits. One possible implementation of the measurement is a two-outcome POVM which includes two projectors $E_1$ and $E_2$ such that $E_1+E_2=1_2$ and where $E_1$ projects onto a two-dimensional subspace of the four-dimensional vector space of a two-qubit system, and $E_2$ is the projector onto the orthogonal complement of the image of $E_1$.

In general, measurements may include validation accesses or registers employed in challenges. These challenges may involve two or more quantum bits and POVMs with two or more outcomes. The quantum-mechanical feature that underlies this validation procedure is that quantum information cannot be copied without disturbing it. This can be used to detect forgery attempts that aim to make copies of the coin 400.

Figure 5:
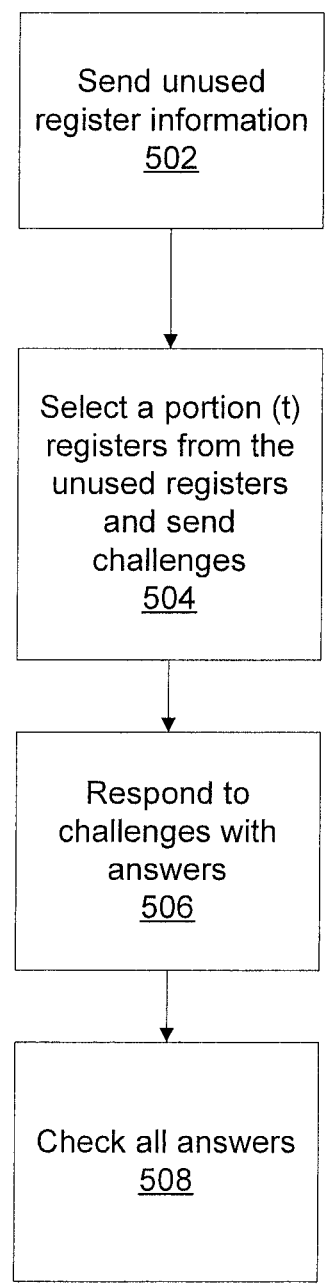
FIG. 5 is a block/flow diagram showing verification of quantum-mechanical legal tender in FIG. 1 in further detail.

Referring to FIG. 5, further details of block 108 of FIG. 1 which handles the validation of a given coin are provided. A coin owner may perform the following to prove the validity of the coin to a vendor or to himself In block 502, the coin holder/owner sends the bank or institution a list of all the coin's registers that have not been used in previous verifications. In block 504, the bank chooses t registers from the registers listed by the coin holder and sends back the list of the chosen registers along with t challenges, one for every chosen register (or other combinations if desired). The challenges may be a Boolean operation that relies on the underlying values of the qubits. In block 506, the coin holder responds to the t challenges with respect to the t chosen registers and sends the answers back to the bank. This may include computing the Boolean operations on the qubits and returning an answer.

If indeed the list announced in block 502 consisted of previously "untouched" registers, then the coin holder with certainty produces t valid responses to the given challenges. In block 508, the bank, who has created the coin and therefore knows what the valid responses should be, verifies the answers given by the coin holder. The verification is declared successfully passed if and only if all t answers are valid.

Figure 6:
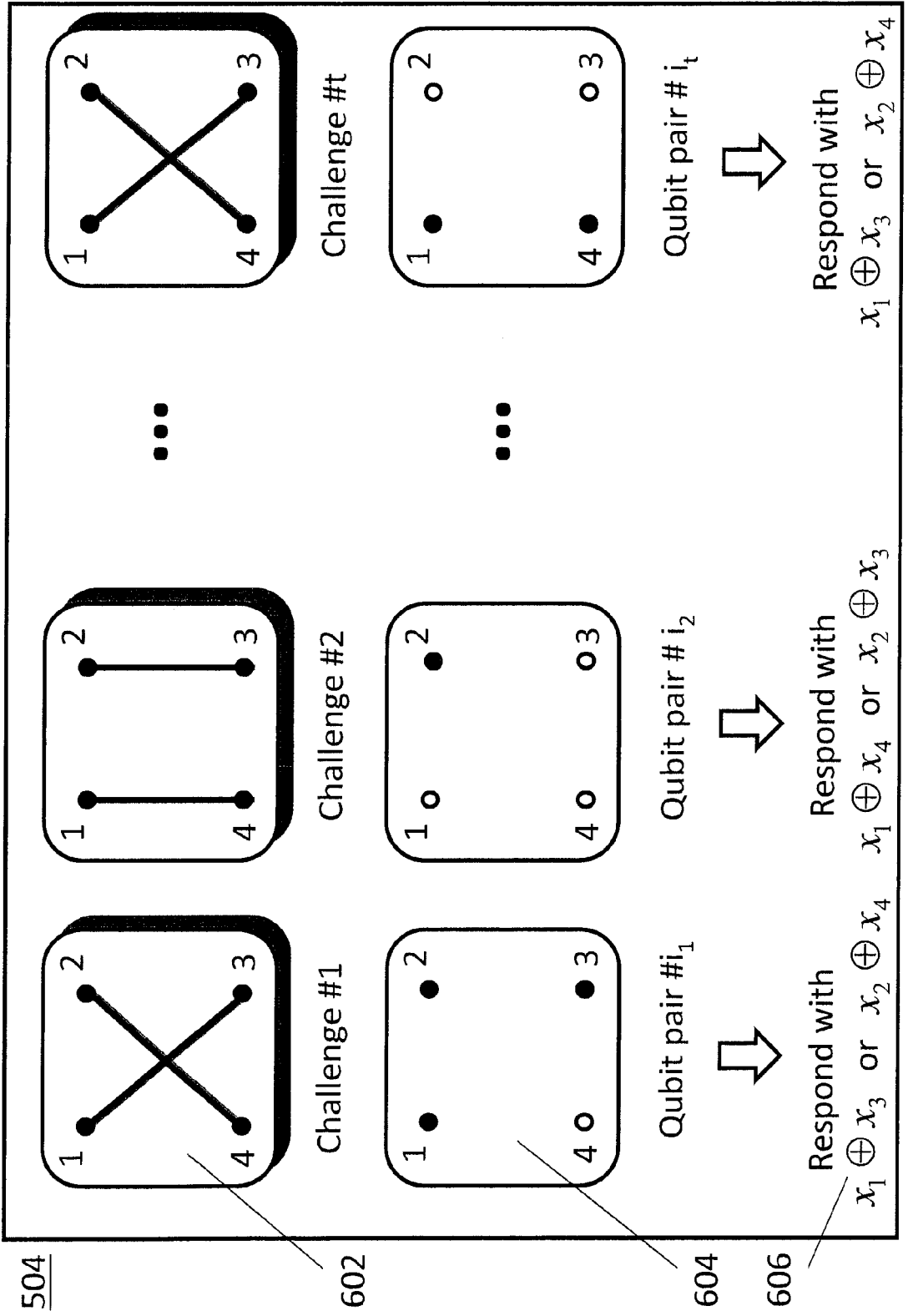
FIG. 6 is a block diagram showing verification through challenges in accordance with one illustrative embodiment.

Referring to FIG. 6, block 504 during the challenge-response phase of the validation is described in greater detail. By construction, a fair coin holder passes the verification procedure with success probability 100%. On the other hand, the present scheme is secure due to the fact that at least 2k/3 registers must still be unused when verification is performed, therefore a valid coin cannot be split in two (that would give every half only k/2 valid registers). The accuracy of the list of valid registers that the coin holder provides to the bank is verified in blocks 502-508 of FIG. 5, because if a considerable fraction of the registers declared to be unused are not unused then at least one such register would appear among the t chosen by the bank in block 504. The properties of the registers (404) guarantee that they cannot be "reused", in the sense that if the same register appears among the chosen t in several different runs of the verification procedure then at least one run would fail with high probability, and therefore cheating would be detected.

As described above, challenge questions 602 include a set of perfect matchings that define a measurement that should be applied to each component 604 of the system. The holder of the coin should respond with one of two possible parities 606. If the answer does not match the initially chosen string x corresponding to the quantum state, the bank flags this as an invalid coin.

Referring to block 602 of FIG. 6 and assuming that the basis states of the four-dimensional vector space corresponding to a two-qubit system (403) are labeled by $|1\rangle, |2\rangle, |3\rangle, |4\rangle$, we obtain the projectors $E_1$ which projects to the span of $|1\rangle$ and $|3\rangle$ and $E_2$ which projects to the span of $|2\rangle$ and $|4\rangle$. Any given state will be projected into one of the two spaces and the measurement outcome (i.e., the label i=1 or i=2, corresponding to either $E_1$ or $E_2$) will be obtained as a result of the POVM. As an example, consider the state $\Sigma_{1\leq i\leq n}(-1)^{x_i}|i\rangle$ that corresponds to block 604. Note that open circles correspond to a relative phase −1 and a bolded circle to a relative phase +1, where the state is given by $|1\rangle+|2\rangle+|3\rangle-|4\rangle$ (up to normalization). The POVM measurement of this state with respect to $E_1$ and $E_2$ as above will have both outcomes "1" and "2" as possible outcomes. If the outcome was "1", which corresponds to the projector onto $|1\rangle$ and $|3\rangle$, the state collapses to $|1\rangle+|3\rangle$). If the outcome was "2", which corresponds to the projector onto $|2\rangle$ and $|4\rangle$, the state collapses to $|2\rangle - |4\rangle$. Next, the validation procedure applies the unitary transformation $$H_2 = \frac{1}{\sqrt{2}} \begin{pmatrix} 1 & 1 \\ 1 & -1 \end{pmatrix}$$

to the resulting collapsed state and measures the system in the standard basis. The possible results of this step are to obtain "+" in the first case (corresponding to the first row of $H_2$) and "−" (corresponding to the second row of $H_2$). The result is now interpreted as being the Boolean value "b=0" (for "+") or being the Boolean value "b=1" (for "−"). The validation step concludes with answering with the pair (i, b) of numbers, where i is the label "1" or "2" of the projector that was randomly selected by the POVM, together with the measured result b that was obtained after applying the transformation $H_2$. The validation passes the challenge posed by the selection of the POVM (in this case $\{1, 3\}$ versus $\{2, 4\}$) if the value b provided in the answer to the challenge is equal to the Boolean sum of the values given in positions 1 and 3 (where open circle denotes "0" and bolded circle denotes "1"), provided that i=1, and equal to the Boolean sum of the values given in positions 2 and 4, provided that i=2.

Referring to FIG. 7, block 202 of the system for synthetic commodities based on quantum-mechanical principles is shown in greater detail. In block 702, an issuing bank or institution is constrained by having to solve a computationally hard problem in order to create strings x that can be used for the creation of the coins. The computationally hard problem could be any of a large class of problems for which no efficient algorithm is known. This includes problems which reside in the complexity class NP and which are known to be complete for said class. Such problems include the traveling salesman problem, Boolean constraint satisfaction problems, in particular 3 SAT, problems of finding maximum cliques in graphs, etc. The problems may also include problems which are hard for the complexity class NP, but not known to reside in NP, such as decoding a linear code or finding the shortest vector in a general n-dimensional lattice over the real numbers or finding the closest lattice vector to a given vector. The problems may also include problems which are neither known to be NP complete and neither known to be solvable in polynomial time. Such problems include the problem to compute the automorphisms of a given graph and the problem to decide whether two given graphs are isomorphic or not (and to compute an isomorphism if they are isomorphic), the problem to decompose an integer number into its prime factors, and the problems of computing discrete logarithms of numbers in the unit group of a finite field or, more generally, in a finite group. The hardness of solving any of these problems simulates the mining, growing or harvesting aspects of the commodity. Other methods for simulating this may also be employed. In block 704, a new and unique serial number is selected which will be attached to the coin. Also, in block 706, a sequence of k random Boolean strings of length n is generated, where k and n are a security parameter that can be chosen beforehand. The Boolean strings may be randomly generated or have portions selected by the bank or other institution. In block 708, for each of the Boolean strings x that were generated, a quantum mechanical state of the form $\Sigma_{1 \leq i \leq n}(-1)^{x_i}|i\rangle$ is created, where i runs over the coordinates of x. Notice that only log(n) qubits are necessary for creating one state of this form. In a simple embodiment, n is chosen to be the number 2, i.e., in this case pairs of qubits are used to represent the state. These steps are explained in greater detail above with reference to FIG. 3.

Referring to FIG. 8, further details of block 206 of FIG. 2 which handles the validation of a given coin are provided. A coin owner may perform the following to prove the validity of the coin to a vendor or to himself. In block 802, the coin holder/owner sends the bank or institution a list of all coin's registers that have not been used in previous verifications. In block 804, the bank chooses t registers from the registers listed by the coin holder and sends back the list of the chosen registers along with t challenges, one for every chosen register. In block 806, the coin holder responds to the t challenges with respect to the t chosen registers and sends the answers back to the bank.

If indeed the list announced in block 802 consisted of previously "untouched" registers, then the coin holder with certainty produces t valid responses to the given challenges. In block 808, the bank, who has created the coin and therefore knows what the valid responses should be, verifies the answers given by the coin holder. The verification is declared successfully passed if and only if all t answers are valid.

The present embodiments provide convenience of use and unconditional security guarantees. A quantum cash scheme in accordance with the present principles can, at the same time, admit unconditional security guarantees and provide simplicity of verification using a classical communication channel. Moreover, the classical channel used does not have to be encrypted, the whole verification protocol can be run openly through a public communication channel of any type, and would not compromise the security of the scheme.

Regarding the quantum-mechanical implementation of legal tender, the features of the system can be made noise resistant, i.e., errors in the quantum state that are part of the coin can be tolerated. The noise resistance is an inherent feature of the described systems/methods.

Having described preferred embodiments of a systems and methods for system and method for synthetic commodity and synthetic legal tender creation (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A quantum mechanical credit unit, comprising:
    a plurality of qubit strings stored in computer readable storage media and configured for answering challenge questions during a verification procedure and responding to a validating entity, the plurality of k qubit strings being stored in quantum registers, where k is a selected security parameter for the credit unit and a positive natural number;
    an information register stores information about qubit strings that remain unused to provide qubit strings to be used during the verification procedure; and
    a unique serial number configured to identify the credit unit without association with a holder of the credit unit or the qubit strings,
    wherein the challenge questions and the responses to the challenge questions comprise Boolean strings and are exchanged through a classical channel.

2. The credit unit as recited in claim 1, wherein the credit unit includes at least one of legal tender and a synthetic commodity.

3. The credit unit as recited in claim 1, wherein the qubit strings include random data.

4. The credit unit as recited in claim 1, wherein verification measurements from the credit unit are employed as a verification mechanism to determine validity of the credit unit.

5. The credit unit as recited in claim 4, wherein the verification measurements include one or more challenges to a portion of the unused qubit strings in the registers to determine validity of the credit unit.

6. A method for issuing a credit unit, comprising:
associating the credit unit with a unique serial number;
generating a sequence of k random Boolean strings of length n, where k and n are security parameters and positive natural numbers;
generating quantum mechanical states of the form $\Sigma_{1 \leq i \leq n}(-1)^{x_i}|i\rangle$, where i, being an integer, runs over coordinates of the Boolean strings, x, to generate result quantum states employed in a verification procedure of the credit unit and $x_i$ is each digit of x;
storing the Boolean strings and the result quantum states unit together with a serial number in a computer readable storage media which enables transference of the credit unit in accordance with a transaction;
providing, to a holder of the credit unit in the verification procedure, challenge questions comprising the Boolean strings; and
receiving, from the holder, an answer to the challenge questions.

7. The method as recited in claim 6, wherein associating a credit unit with a new and unique serial number includes maintaining passivity so that an institution issuing the credit unit does not learn information about the credit unit or a holder of the credit unit.

8. The method as recited in claim 6, wherein k determines a number of measurements permitted for the credit unit.

9. The method as recited in claim 6, wherein n is equal to 4.

10. The method as recited in claim 6, wherein the credit unit includes legal tender.

11. The method as recited in claim 6, wherein the credit unit includes a synthetic commodity and the method further comprises constraining an issuing institution from generating credit units to simulate acquisition of a commodity.

12. The method as recited in claim 11, wherein constraining includes solving a computationally hard problem to create strings for the credit unit.

13. A method for validating a credit unit, comprising:
providing by a holder of the credit unit under verification to a validating entity a list of all credit unit registers unused in previous verifications, wherein the credit unit registers include k qubit strings with quantum mechanical states of the form $\Sigma_{1 \leq i \leq n}(-1)^{x_i}|i\rangle$, where i, being an integer, runs over coordinates of Boolean strings, x, of length n to generate the quantum states, k and n are positive integers, and $x_i$ is each digit of x;
selecting by the validating entity a portion of the registers from the list of unused registers and sending back the list of selected registers along with challenges for the selected registers;
responding by the holder of the credit unit under verification to the challenges with respect to the selected registers; and
declaring the verification a success if and only if a needed amount of answers are valid,
wherein the challenges and the responses to the challenges comprise the Boolean strings and are exchanged through a classical channel.

14. The method as recited in claim 13, wherein declaring is performed by the holder of the credit unit through contact with the validating entity or an issuer of the credit unit.

15. The method as recited in claim 13, wherein the list of unused registers includes at least 2k/3 registers.

16. The method as recited in claim 13, wherein responding includes performing a quantum measurement on the qubit strings for the verification.

17. The method as recited in claim 13, further comprising labeling as used, the registers that were employed in the verification.

18. The method as recited in claim 13, wherein declaring includes maintaining passivity so that information about the credit unit or the holder of the credit unit is not learned.

19. The method as recited in claim 13, further comprising securely validating the credit unit on a classic communication channel without encryption.

\* \* \* \* \*